United States Patent
Caro et al.

(10) Patent No.: US 12,548,185 B2
(45) Date of Patent: Feb. 10, 2026

(54) IDENTIFYING OBJECTS USING SPATIAL ONTOLOGY

(71) Applicant: Apple Inc., Cupertino, CA (US)

(72) Inventors: Perry A. Caro, San Jose, CA (US); Nikhil Gupta, Seattle, WA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 18/279,814

(22) PCT Filed: Feb. 28, 2022

(86) PCT No.: PCT/US2022/018137
§ 371 (c)(1),
(2) Date: Aug. 31, 2023

(87) PCT Pub. No.: WO2022/187137
PCT Pub. Date: Sep. 9, 2022

(65) Prior Publication Data
US 2024/0144513 A1    May 2, 2024

Related U.S. Application Data

(60) Provisional application No. 63/155,081, filed on Mar. 1, 2021.

(51) Int. Cl.
*G06V 10/764* (2022.01)
*G06T 7/20* (2017.01)
(Continued)

(52) U.S. Cl.
CPC .................. *G06T 7/70* (2017.01); *G06T 7/20* (2013.01); *G06T 17/00* (2013.01); *G06V 10/764* (2022.01); *G06V 2201/07* (2022.01)

(58) Field of Classification Search
CPC ....................................................... G06F 9/451
See application file for complete search history.

(56) References Cited

U.S. PATENT DOCUMENTS

| 5,982,944 A | * | 11/1999 | Vaidyanathan | G06T 7/45 382/172 |
| 2009/0327326 A1 | * | 12/2009 | Bahr | G06F 16/93 707/999.102 |

(Continued)

FOREIGN PATENT DOCUMENTS

| CN | 111259639 B | * | 9/2023 | |
| WO | WO-2020191101 A1 | * | 9/2020 | G06T 19/20 |

OTHER PUBLICATIONS

Office Action received for European Patent Application No. 22710883.4, mailed on Mar. 19, 2025, 9 pages.

(Continued)

*Primary Examiner* — Di Xiao
(74) *Attorney, Agent, or Firm* — YHE Law LLP

(57) ABSTRACT

In an exemplary process, a representation of a setting is obtained. A first object is detected based on the representation of the setting and a set of identifiers is retrieved. In response to detecting a change in the representation of the setting, the set of identifiers is modified based on a first set of definitions. A user input associated with the representation of the setting is received, and based on the modified set of identifiers, a user intent corresponding to the user input is determined.

36 Claims, 8 Drawing Sheets

(51) Int. Cl.
G06T 7/70 (2017.01)
G06T 17/00 (2006.01)

(56) References Cited

U.S. PATENT DOCUMENTS

| | | |
|---|---|---|
| 2014/0310595 A1 | 10/2014 | Acharya et al. |
| 2019/0108682 A1 | 4/2019 | Spivack et al. |
| 2019/0228588 A1* | 7/2019 | Rockel .................... G06T 7/80 |
| 2019/0251350 A1 | 8/2019 | Shukla et al. |
| 2019/0392212 A1* | 12/2019 | Sawhney ................ G06T 7/70 |
| 2020/0376369 A1 | 12/2020 | Reddan et al. |
| 2021/0025727 A1 | 1/2021 | Barnes et al. |
| 2021/0097776 A1* | 4/2021 | Faulkner .............. G06V 40/113 |
| 2021/0409379 A1* | 12/2021 | Hwang ................ G08G 1/0112 |
| 2022/0392174 A1* | 12/2022 | Tahara .................. G06F 18/22 |

OTHER PUBLICATIONS

International Preliminary Report on Patentability received for PCT Patent Application No. PCT/US2022/018137, mailed on Sep. 14, 2023, 10 pages.
International Search Report and Written Opinion received for PCT Patent Application No. PCT/US2022/018137, mailed on May 11, 2022, 16 pages.

* cited by examiner

IDENTIFYING OBJECTS USING SPATIAL ONTOLOGY

CROSS REFERENCE TO RELATED APPLICATIONS

This application is a U.S. National Stage Patent Application of PCT Application No. PCT/US2022/018137, entitled "IDENTIFYING OBJECTS USING SPATIAL ONTOLOGY," filed on Feb. 28, 2022, which claims priority to U.S. Provisional Application No. 63/155,081, entitled "IDENTIFYING OBJECTS USING SPATIAL ONTOLOGY," filed Mar. 1, 2021. The contents of each of these applications are hereby incorporated by reference in their entireties for all purposes.

BACKGROUND

1. Field

The present disclosure relates generally to extended reality, and more specifically to techniques for identifying objects using one or more spatial ontologies.

2. Description of Related Art

Traditional extended reality environments may include various representations of virtual and physical objects. A user viewing the environment may interact with the objects in different ways.

BRIEF SUMMARY

This disclosure generally describes techniques for identifying various objects in an environment. Extended reality environments provide a platform to enable users to interact with a respective environment. For example, a user may provide an input related to a physical or virtual object depicted in the environment, using methods including physical controls, speech commands, gaze-based operations, and the like. When using speech commands, the user may refer to various objects depicted in the environment, such as furniture, walls, appliances, or other objects. However, traditional extended reality systems are not well-equipped to efficiently identify objects in a scene in order to respond to user requests in an effective manner. For example, such systems do not include a consistent set of object identifiers, much less other attributes defining relationships between the objects and additional object properties. Thus, an improved system for object identification using one or more spatial ontologies is desired.

According to some embodiments, a representation of a setting is obtained. A first object is detected based on the representation of the setting and a set of identifiers is retrieved. In response to detecting a change in the representation of the setting, the set of identifiers is modified based on a first set of definitions. A user input associated with the representation of the setting is received, and based on the modified set of identifiers, a user intent corresponding to the user input is determined.

DESCRIPTION

Figure 1A:
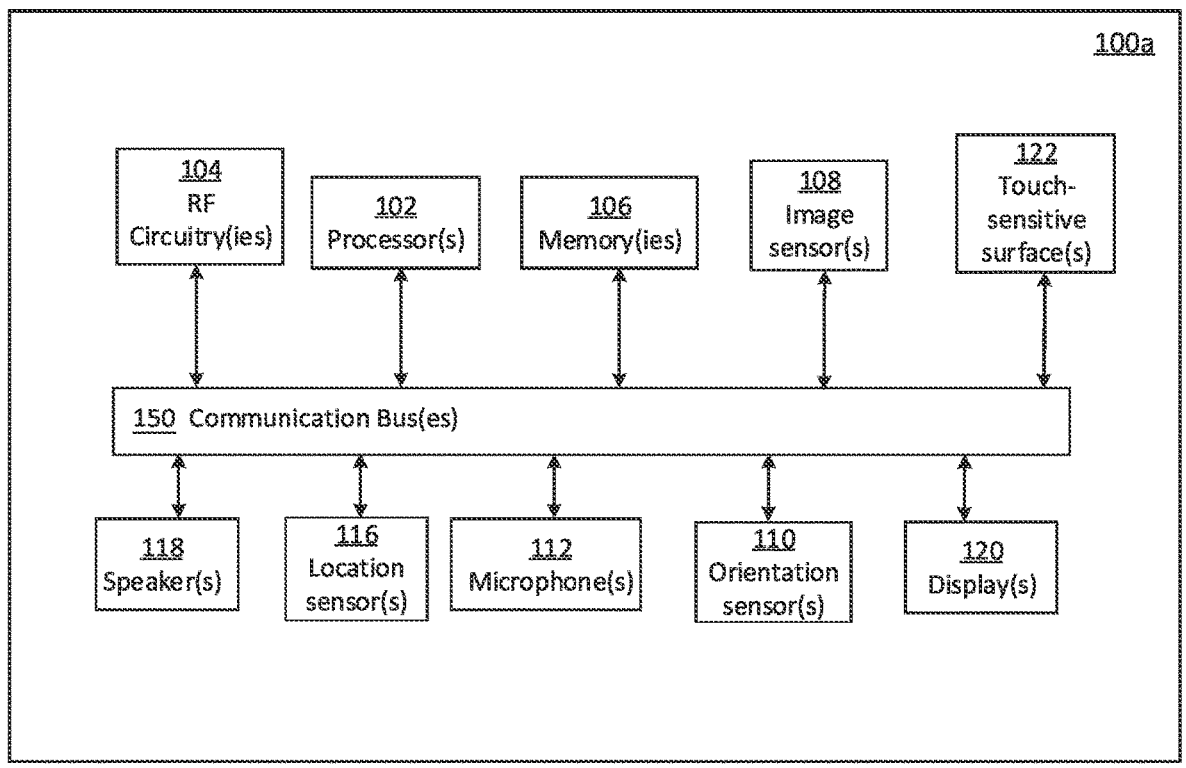
FIGS. 1A-1B depict exemplary systems for use in various extended reality technologies.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Figure 1B:
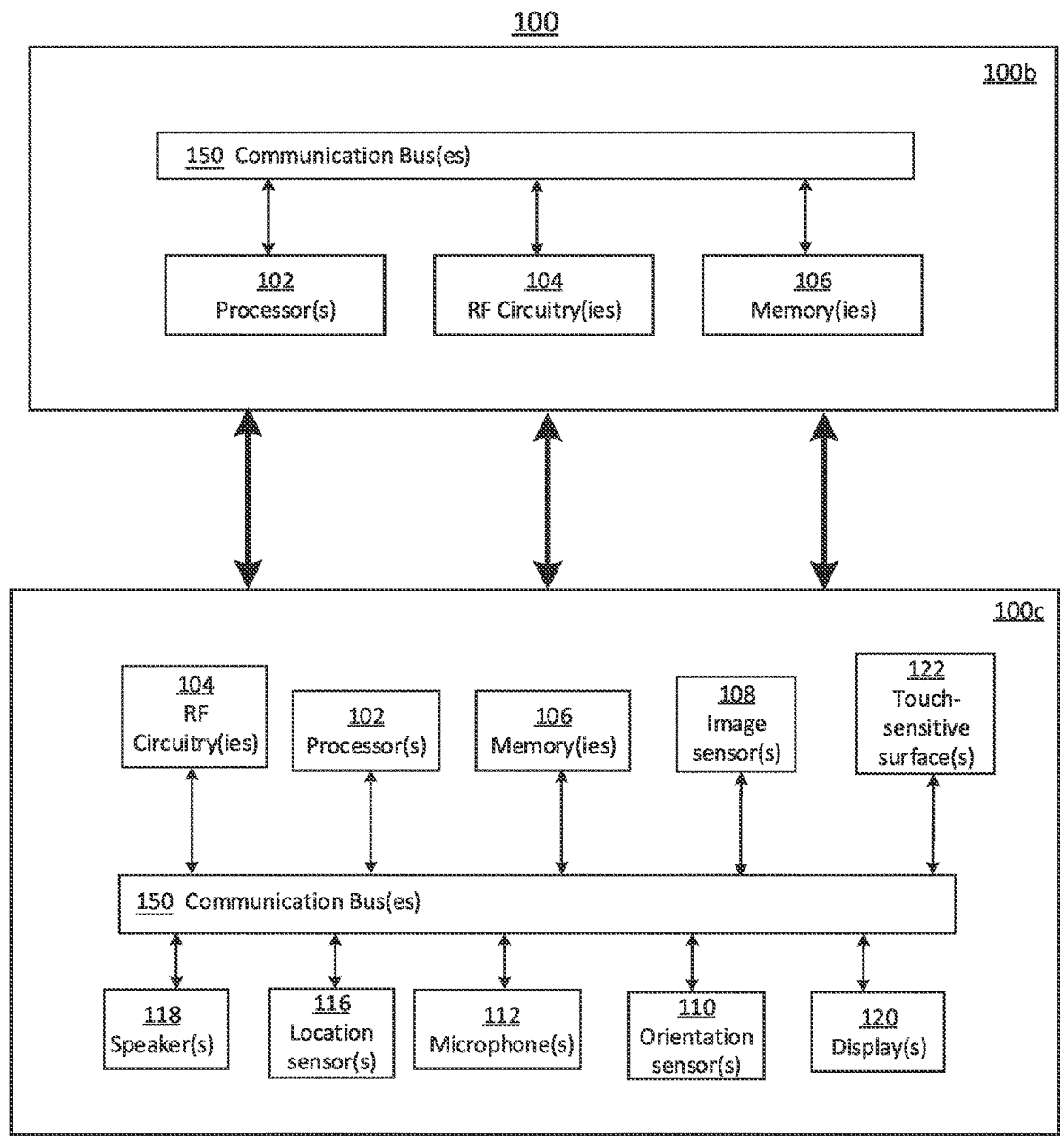

FIG. 1A and FIG. 1B depict exemplary system 100 for use in various extended reality technologies.

As shown in FIG. 1A, system 100 includes device 100a. Device 100a includes RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100a.

In some examples, a base station device (e.g., a computing device, such as a remote server, mobile device, or laptop) implements some components of system 100 and a second device (e.g., a head-mounted device) implements other components of system 100. In some examples, device 100a is implemented in a base station device or in a second device.

As shown in FIG. 1B, in some examples, system 100 includes two or more devices in communication, e.g., via a wired connection or a wireless connection. First device 100b (e.g., a base station device) includes memory(ies) 106, RF circuitry(ies) 104, and processor(s) 102. Such components optionally communicate using communication bus(es) 150 of device 100b. Second device 100c (e.g., a head-mounted device) includes components such as RF circuitry(ies) 104, processor(s) 102, memory(ies) 106, image sensor(s) 108, touch-sensitive surface(s) 122, speaker(s) 118, location sensor(s) 116, microphone(s) 112, orientation sensor(s) 110, and display(s) 120. These components optionally communicate using communication bus(es) 150 of device 100c.

System 100 includes RF circuitry(ies) 104. RF circuitry(ies) 104 optionally include circuitry for communicating with networks (e.g., the Internet, a wireless network (e.g., such as cellular networks and wireless local area networks (LANs)), and/or intranets) and/or electronic devices. RF circuitry(ies) 104 optionally includes circuitry for communicating using near-field communication and/or short-range communication (e.g., Bluetooth®).

System 100 includes processor(s) 102 and memory(ies) 106. Processor(s) 102 include one or more graphics processors, one or more general processors, and/or one or more digital signal processors. In some examples, memory(ies) 106 are one or more non-transitory computer-readable storage mediums (e.g., random access memory, flash memory) storing computer-readable instructions configured to be executed by processor(s) 102 to perform the techniques described below System 100 includes image sensor(s) 108. Image sensors(s) 108 optionally include one or more infrared (IR) sensor(s), e.g., a passive IR sensor or an active IR sensor, to detect infrared light from the physical environment. For example, an active IR sensor includes an IR emitter (e.g., an IR dot emitter) for emitting infrared light into the physical environment. Image sensor(s) 108 also optionally include one or more visible light image sensors, such as complementary metal-oxide-semiconductor (CMOS) sensors and/or charged coupled device (CCD) sensors capable of obtaining images of physical elements from the physical environment. Image sensor(s) 108 also optionally include one or more event camera(s) configured to capture movement of physical elements in the physical environment. Image sensor(s) 108 also optionally include one or more depth sensor(s) capable of detecting the distance of physical elements from system 100. In some examples, system 100 uses IR sensors, CCD sensors, event cameras, and depth sensors together to detect the physical environment around system 100. In some examples, image sensor(s) 108 include first and second image sensors. The first and second image sensors are optionally capable of capturing images of physical elements in the physical environment from two respective different perspectives. In some examples, system 100 uses image sensor(s) 108 to detect the position and orientation of system 100 and/or display(s) 120 in the physical environment. For example, system 100 uses image sensor(s) 108 to track the position and orientation of display(s) 120 relative to one or more fixed elements in the physical environment. In some examples, image sensor(s) 108 are capable of receiving user inputs, such as hand gestures.

In some examples, system 100 includes touch-sensitive surface(s) 122 for receiving user inputs, such as tapping or swiping inputs. In some examples, touch-sensitive surface(s) 122 and display(s) 120 are combined into touch-sensitive display(s).

In some examples, system 100 includes microphones(s) 112. System 100 uses microphone(s) 112 to detect sound from the user's physical environment or from the user. In some examples, microphone(s) 112 includes a microphone array (e.g., including a plurality of microphones) that optionally operate together, e.g., to locate the spatial source of sound from the physical environment or to identify ambient noise.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as relative to physical elements in the physical environment. Orientation sensor(s) 110 optionally include gyroscope(s) and/or accelerometer(s)

System 100 includes display(s) 120. Display(s) 120 may operate with a transparent or semi-transparent displays (and optionally with one or more imaging sensors). Display(s) 120 may include an opaque display. Display(s) 120 may allow a person to view a physical environment directly through the display, and may also allow addition of virtual content to the person's field of view, e.g., by superimposing virtual content over the physical environment. Display(s) 120 may implement display technologies such as a digital light projector, a laser scanning light source, LEDs, OLEDs, liquid crystal on silicon, or combinations thereof. Display(s) 120 can include substrates through which light is transmitted, e.g., optical reflectors and combiners, light waveguides, holographic substrates, or combinations thereof. As a particular example, the transparent or semi-transparent display may selectively transition between a transparent or semi-transparent state and an opaque state. Further example implementations of display(s) 120 include display-capable lenses, tablets, smartphones, desktop computers, laptop computers, heads up displays, display-capable automotive windshields, or display-capable windows. In some examples, system 100 is a projection-based system. For example, system 100 projects virtual objects onto a physical environment (e.g., projects a holograph onto a physical environment or projects imagery onto a physical surface). As another example, system 100 uses retinal projection to project images onto a person's eyes (e.g., retina). In some examples, system 100 can be configured to interface with an external display (e.g., a smartphone display).

System 100 may further include one or more speech-to-text (STT) processing modules each including one or more automatic speech recognition (ASR) systems for performing speech-to-text conversions on speech received from the various microphones. Each ASR system may include one or more speech recognition models and may implement one or more speech recognition engines. Examples of speech recognition models may include but are not limited to include Deep Neural Network Models, n-gram language models, Hidden Markov Models (HMM), Gaussian-Mixture Models, and the like. A natural language processing module may further obtain candidate text representations of the speech input and associate each of the candidate text representations with one or more recognizable "actionable intents." In some examples, the natural language processing is based on use of ontologies. An ontology is a hierarchical structure containing many nodes, each node representing an actionable intent related to other actionable intents. These actionable intents may represent tasks that the system is capable of performing. The ontology may further include properties representing parameters associated with an actionable intent, a sub-aspect of another property, and the like. A linkage between an actionable intent node and a property node in the ontology may define how parameters represented by the property node are related to the task represented by the actionable intent node.

Figure 2A:
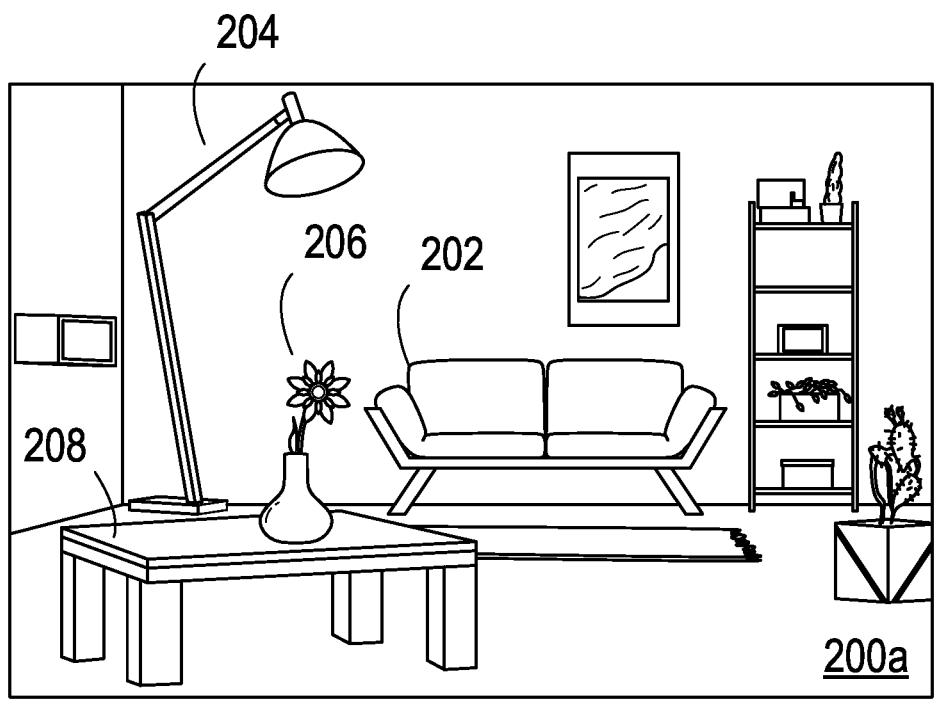
FIGS. 2A-2C depict an exemplary process for object identification using one or more spatial ontologies.

With reference now to FIGS. 2A-4, exemplary techniques for object identification using one or more spatial ontologies are described. FIG. 2A depicts a representation 200a corresponding to a surrounding environment of an electronic device, such as device 100a for example. Representation 200a may be based on the perspective of a user, for example, such based on one or more cameras receiving image information and attached to the user's headset or other device in control of the user. In general, the environment may correspond to a physical environment, a virtual environment, an AR environment with virtual objects superimposed over a physical environment, and the like. The environment may include various physical objects, such as tables, shelves, couches, walls, paintings, and lamps. The image information may include representations of the physical objects, and may also include representations of virtual objects. For example, representation 200a may include a couch representation 202, a lamp representation 204, a vase representation 206, and a table representation 208. Couch representation 202, vase representation 206, and table representation 208 may correspond to physical couch, vase, and table objects, respectfully, in the surrounding device environment. Lamp representation 204 may, in some examples, correspond to a virtual object, such that there is no corresponding physical vase in the surrounding device environment. In an alternate example, representation 200a may also correspond to an entirely virtual setting, such that couch representation 202, lamp representation 204, vase representation 206, and table representation 208 each correspond to representations of virtual objects.

Initially, a set of definitions may be utilized in order to identify various objects in a representation of a setting. This reactive form of object identification may continually and dynamically occur as the representation of the setting changes, as discussed herein. For example, in general, upon initiating the electronic device (e.g., initiating image sensors on the device), loading a virtual or AR environment, etc., a set of identifiers is obtained based on a set of definitions and the representation of a respective setting. In particular, as discussed herein, the set of definitions may include base definitions for descriptive identifiers. These definitions may include object profiles used to identify respective objects in an environment, such as profiles including general object characteristics. The object profiles may generally represent objects semantically, in particular by including defining features of respective objects for object identification, such as general object shape, size, appearance, structure, color scheme, and the like. Accordingly, couch representation 202 may be identified using the set of definitions based on the general object profile for a "couch" contained in the set of definitions. Lamp representation 204, vase representation 206, and table representation 208 may each be similarly identified using general object profiles within the set of definitions, such as those corresponding to "lamp," "vase," and "table," respectively.

Figure 2B:
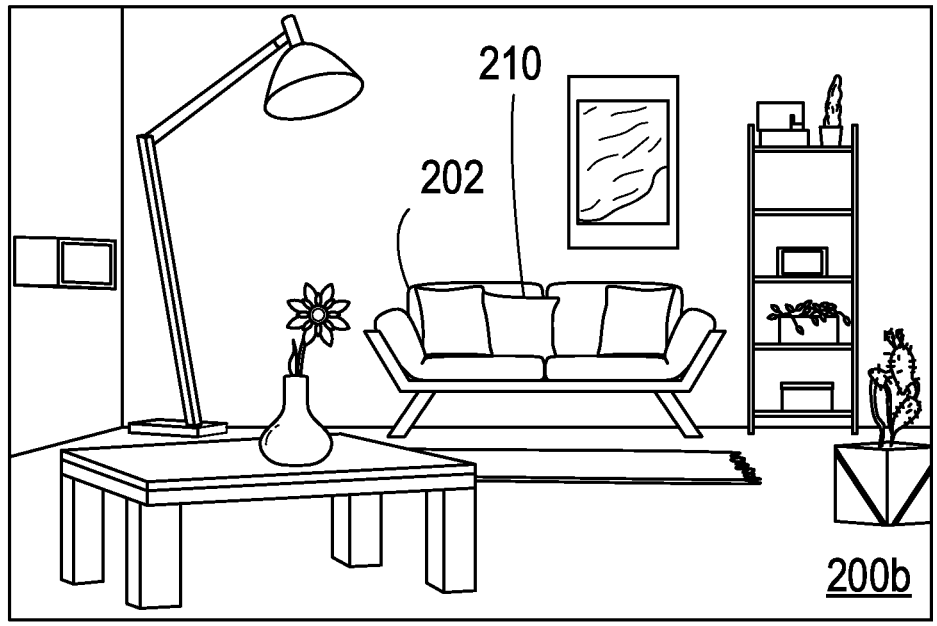

With reference now to FIG. 2B, changes in the representation of the setting may be detected based on various factors. For instance, one or more objects within the surrounding environment may move from a first location to a second location. Physical objects may be added to the environment (e.g., by the user of the electronic device or another user), such as one or more cushions being placed on the couch. Accordingly, one or more objects may be detected based on the representation. In this example, one or more cushion representations are detected in representation 200b (relative to representation 200a in FIG. 2A), such as cushion representations 210 resting on top of couch representation 202. One or more virtual objects may also be populated into the representation by the user, another user associated with the environment, and extended reality application, and the like.

Figure 3A:
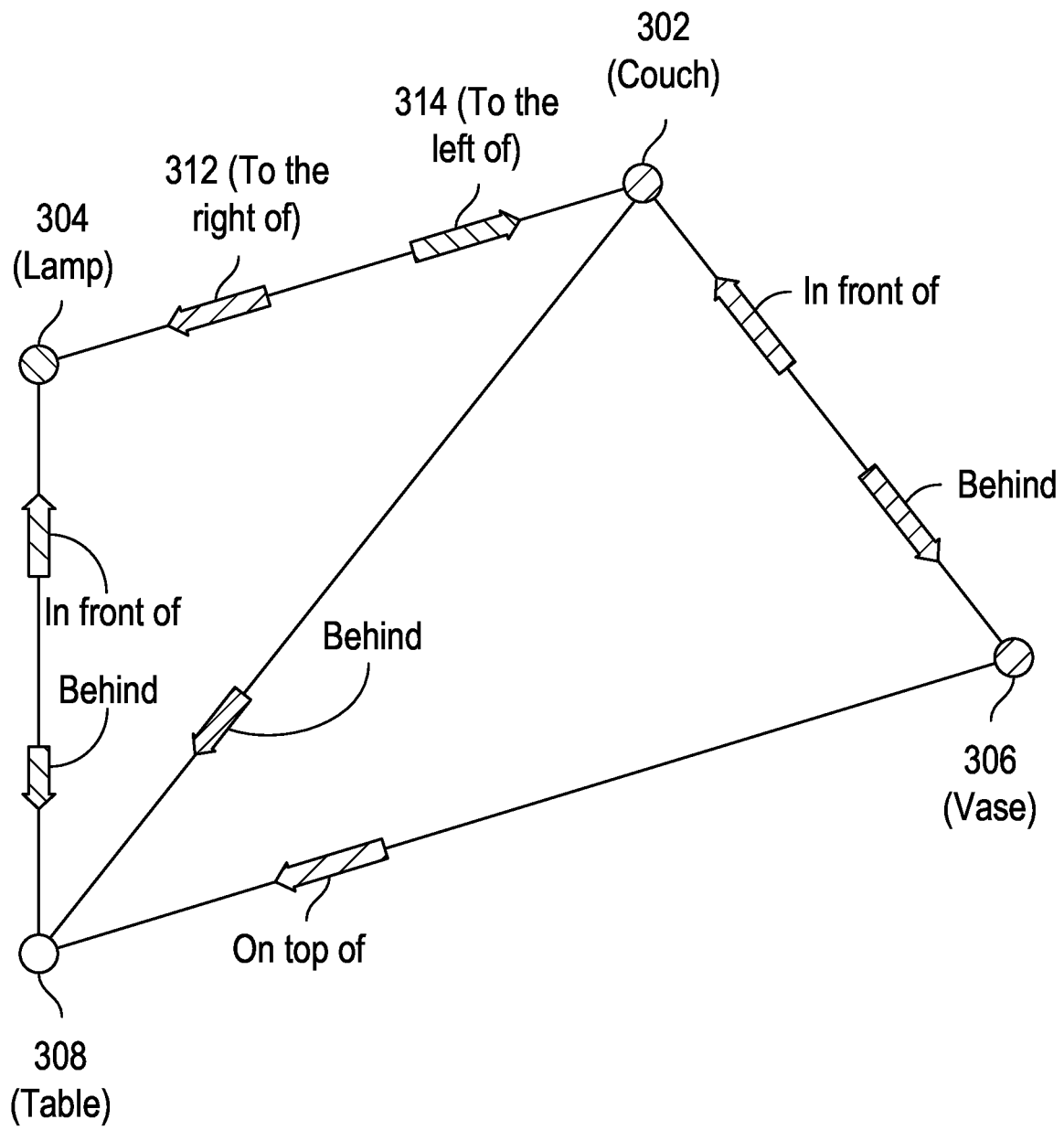
FIGS. 3A-3C depict an exemplary process for object identification using one or more spatial ontologies.

With reference now to FIG. 3A, a set of identifiers is depicted. In general, the set of identifiers may be utilized in order to facilitate the user experience with the extended reality environment. The set of identifiers may represent various physical and virtual objects detected in the environment, and may be dynamically updated based on changes in the representation of the setting. The set of identifiers, which may be referred to as a scene graph, may also be generated based on an underlying spatial ontology. The spatial ontology represents a set of definitions which act as a library of object characteristics for generating the scene graph based on the representation of the setting, as discussed herein. For example, the spatial ontology may include object names (e.g., chair, table, lamp), and further include class definitions for such objects (e.g., furniture, structural, biological, etc.). The class definitions may define a parent object class to which an object belongs. In particular, the association of "chair 'is a' furniture" may indicate that a chair object is within a furniture object class.

The set of identifiers may include descriptive identifiers associated with detected objects. Descriptive identifiers may generally identify a type associated with a detected object. Such identifiers may include one or more string constants contained within a header file, for example. Here, couch representation 202 may be detected, such that an identifier 302 is generated including descriptive identifier "couch." Lamp representation 204 may be detected, such that an identifier 304 is generated including descriptive identifier "lamp." To the extent couch representation 202 corresponds to a physical object in the environment, identifier 302 may also include reality type characteristic such as "physical." Similarly, to the extent lamp representation 204 corresponds to a virtual object, identifier 304 may also include reality type characteristic such as "virtual." Identifiers 306 and 308 may correspond to descriptive identifiers "vase" and "table," respectively. Identifiers 302 ("couch") and 308 ("table") may include a parent identifier corresponding to an object class, such as "furniture." Identifier 304 ("lamp") may include a parent identifier corresponding to "electronics." Identifier 306 ("vase") may include a parent identifier corresponding to "household," for example.

Relationship identifiers may generally identify relationships between respective objects detected from the representation of the setting. Relationship identifiers for a respective detected first object may identify a second detected object and a position of the respective detected first object relative to the detected second object. As an example, based on the perspective of the user, couch representation 202 may be positioned to the right of lamp representation 204 based on the perspective of the device (e.g., one or more cameras or sensors on the device) and thus the resulting representation of the setting. Accordingly, identifier 302 ("couch") may be associated with a relationship identifier 312 identifying lamp representation 204 (via identifier 304, "lamp"), and further identifying a position of "to the right of." In particular, the position indicates that couch representation 202 is "to the right of" lamp representation 204, based on the device perspective. Similarly, lamp representation 204 is positioned to the left of couch representation 202 based on the representation of the setting. Thus, identifier 304 ("lamp") may be associated with a relationship identifier 314 identifying couch representation 202 (via identifier 302, "couch"), and further identifying a position of "to the left of." Specifically, the position indicates that lamp representation 204 is "to the left of" couch representation 202, based on the device perspective. Additional relationship identifiers associated with identifiers 302, 304, 306, and 308 may be included within the set of identifiers, such as "in front of," "behind," "on top of," and the like.

In some examples, relationship identifiers may define additional relationships between detected objects. Various objects in a virtual environment may be contained within other objects. For example, a virtual chest in the environment may include various objects such as virtual books, virtual toys, virtual electronics, and the like. A user may place a virtual object, such as a virtual book, into the virtual chest. Based on a detection of the object placement (e.g., parameter of the virtual setting indicating the user has previously placed the virtual book into the virtual chest), a relationship identifier may be generated identifying a detected virtual book object as contained within the detected virtual chest object, such as "book 'inside' chest." Various objects may also be generated from other objects. For instance, the user may be engaged in an extended reality game, such that a virtual chicken object is included in the environment. Within the context of the extended reality game, the virtual chicken object may generate a virtual egg object. In this example, a relationship identifier may be generated identifying the detected egg object as generated from the detected chicken object, such as "egg 'came from' chicken." In some examples, the user may move a physical object with respect to another physical object, such as moving a book on top of a chest. Here, a relationship identifier may be generated identifying the detected book object resting on top of the chest after the movement, such as "book 'on top of' chest."

In general, properties associated with detected objects may be identified using various additional identifiers. In particular, a material identifier may identify a type of matter that a detected object is made of. For example, identifier 302 ("couch") may be associated with a material identifier corresponding to "cloth." Identifier 308 ("table") may be associated with a material identifier corresponding to "wood." Multiple material identifiers may also be associated with respective objects. For instance, identifier 304 ("lamp") may include material identifiers corresponding to "metal," "glass," "wiring," "plastic," and the like. Other properties representing appearance characteristics of objects may be defined using additional identifiers. One or more numeric properties may be utilized, such as properties relating to size, volume, weight, etc. Such properties may further include coefficients related to the objects. For example, one or more coefficients associated with a detected object include a specific value between 0-100, for example. Lighting coefficients may indicate various light properties of a detected object, such as luster, sheen, gloss, brightness, radiance, etc. Various other coefficients may be related to object features such as object state (e.g., liquid, solid, gas), malleability, sharpness, roughness, temperature, odor, weight, fragility, and the like.

Acoustic coefficients may indicate various acoustic properties of objects in an environment. For example, the acoustic coefficients may be used in order to provide an audible experience to the user which is consistent with the currently viewed environment. In general, the acoustic output provided to the user may be modified as the user navigates a respective environment. For example, although the user may remain physically stationary while navigating a virtual environment, the sound provided to the user may change while the user navigates the virtual environment. The sound provided to the user may thus be tailored in order to provide an acoustic experience consistent with the virtual environment.

With reference back to FIG. 2B, a change in the representation of the setting may be detected. Specifically, an object not previously within the device perspective may come into view such that the representation now includes the object. For example, one or more physical cushion objects may come into view such that representation 200b includes cushion representation 210. In response to detecting this change in the representation of the setting, the set of identifiers may be modified based at least in part on a set of definitions (e.g., a spatial ontology). In general, a spatial ontology may include base definitions for descriptive identifiers, relationship identifiers, material identifiers, and other identifiers corresponding to additional object properties. Base definitions for descriptive identifiers may include object profiles used to identify respective objects in the environment, such as profiles including general object characteristics. The object profiles may include defining features of respective objects for object identification, such as general object shape, size, appearance, structure, color scheme, and the like. The spatial ontology may be generated at least in part using an ontology having definitions for objects as they are commonly referred to by users, such as a natural language processing ontology. For example, a flat wooden rectangular object having four legs is commonly referred to as a "table."

Figure 3B:
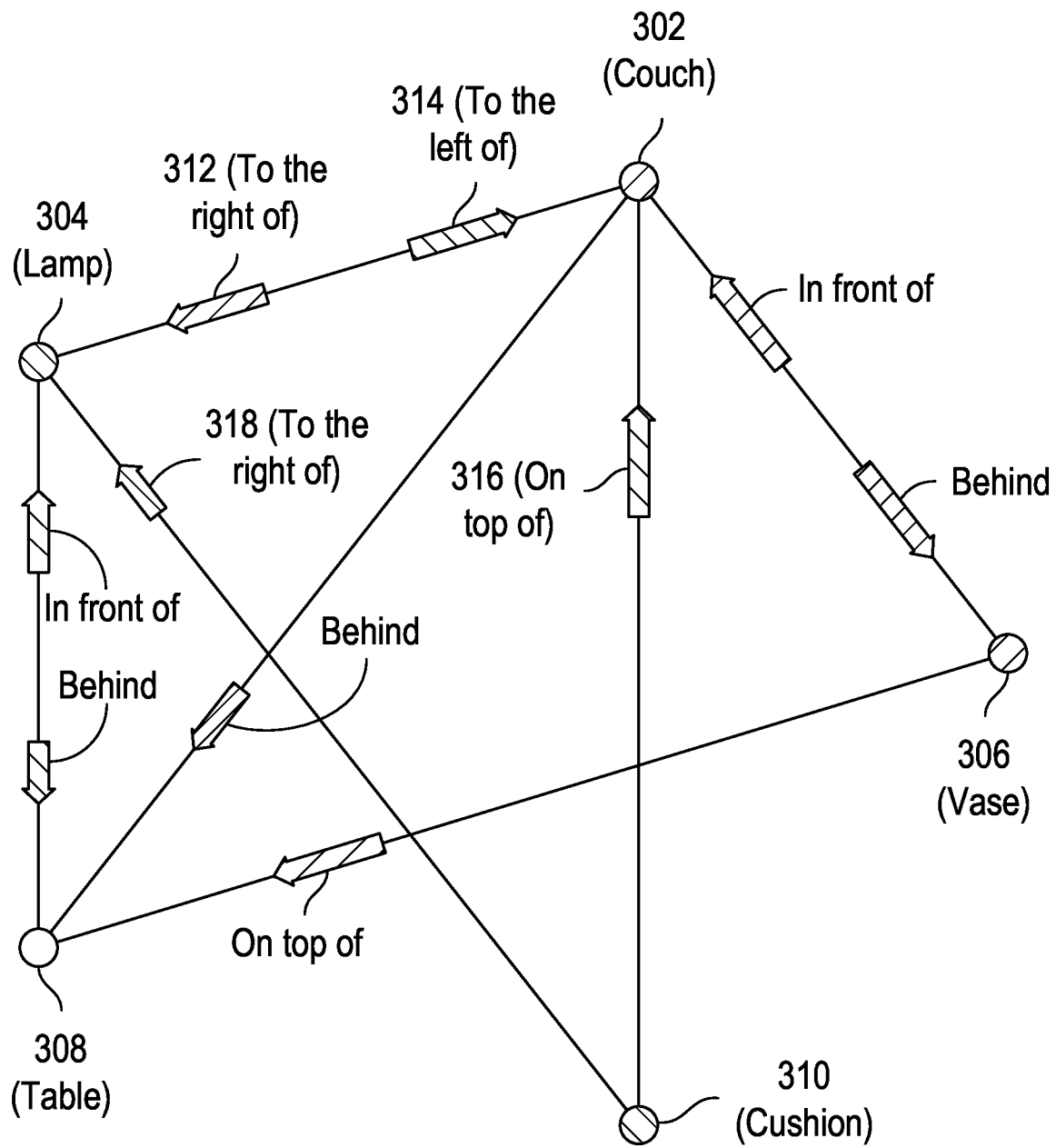

As an example, the spatial ontology may include a base definition for a cushion object, including descriptive identifier "cushion" and an object profile including defining features of a "cushion," such as a square and/or rectangular shape, relative size of two cubic feet, appearance of cloth material, and the like. Using spatial ontology and object profiles, object identification is performed such that the object corresponding to cushion representation 210 is identified as an object having descriptive identifier "cushion." Furthermore, in accordance with a determination that the cushion object is not associated with any identifiers in the set of identifiers, the set of identifiers is modified by adding identifiers corresponding to the newly detected cushion object. With reference now to FIG. 3B, based on the newly detected cushion object corresponding to cushion representation 210, an identifier 310 is generated within the set of identifiers. In particular, using the spatial ontology, identifier 310 is associated with descriptive identifier "cushion." Various relationship identifiers are also added to the set of identifiers with respect to identifier 310 ("cushion"), such as a relationship identifier 316. Relationship identifier 316 may identify couch representation 202 (via identifier 302, "couch"), and further identify a position of "on top of." Specifically, the position indicates that cushion representation 210 is "on top of" couch representation 202, based on the device perspective. Relationship identifier 318 may identify lamp representation 204 (via identifier 304, "lamp"), and further identify a position of "to the right of." This position indicates that cushion representation 210 is "to the right of" lamp representation 204. Additional identifiers may be added to the set of identifiers, such as a material identifier including "cloth" associated with identifier 310 ("cushion").

Figure 2C:
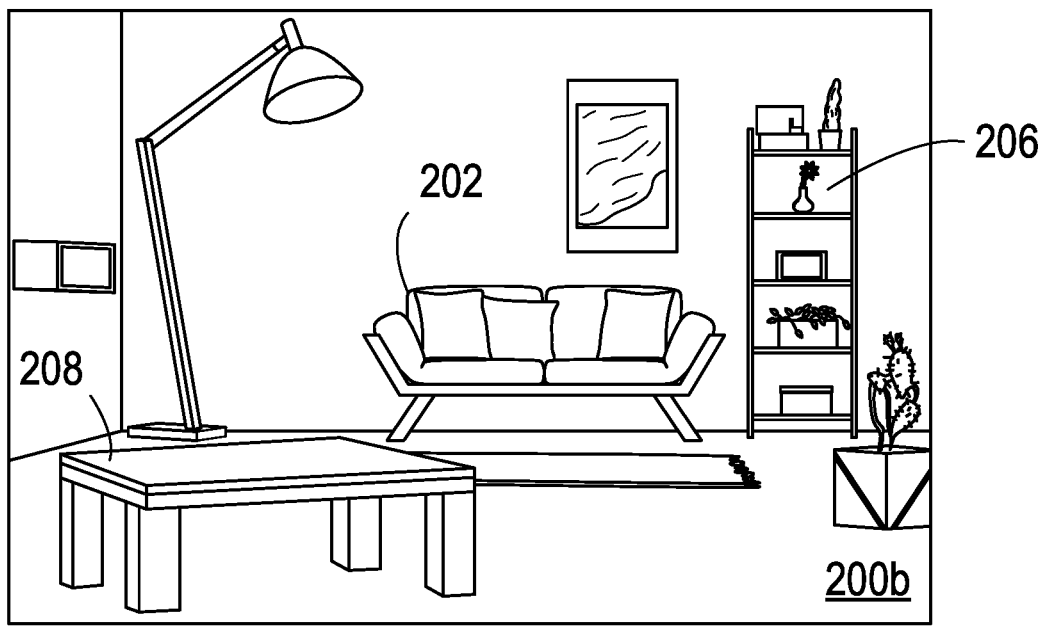
Figure 3C:
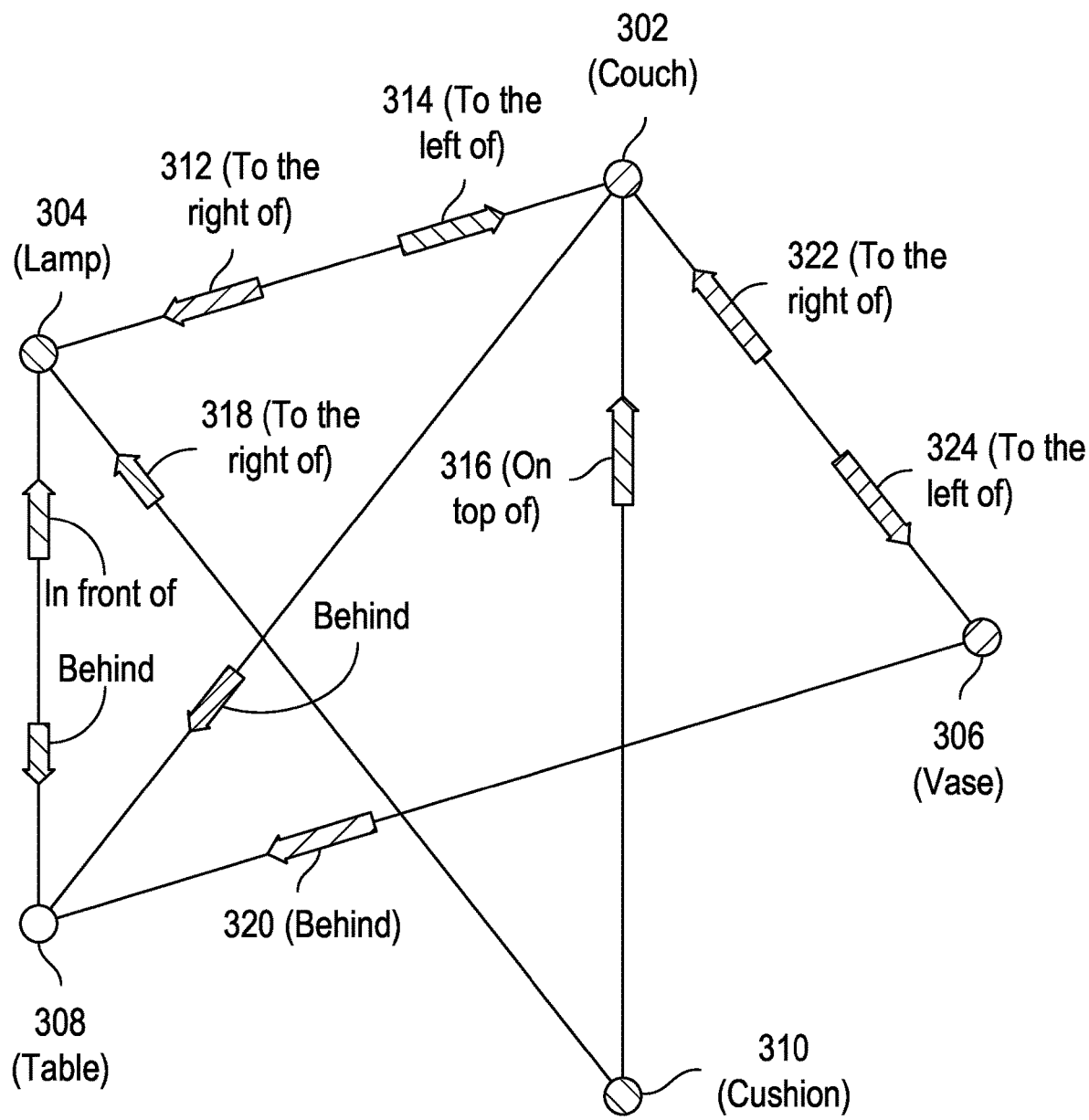

Certain events may cause changes in the representation of the setting to be detected. Such changes may be based on new objects being populated into a setting (e.g., a physical object coming into view, a virtual object being generated, etc.), movement of previously detected objects, movement of the user and/or the electronic device, (e.g., the user walking around the room while wearing the device), the position and/or orientation of the device changing based on user head movements, and the like. In response to detecting changes based on such movements, relationship identifiers associated with various objects in the set of identifiers may be modified. For example, as shown in FIG. 2C, a vase corresponding to vase representation 206 may be moved from a location on top of a table to a position on a shelf. Accordingly, as shown in FIG. 3C, relationship identifiers associated with identifier 306 ("vase") may be modified by modifying the positional values defining the new position of the vase with respect to other objects in the environment. In particular, relationship identifier 320 may identify table representation 208 (via identifier 308, "table"), and may be modified to identify a position of "behind." Specifically, the position indicates that vase representation 206 is now positioned "behind" table representation 308, based on the device perspective (as opposed to previously being positioned "on top of" table representation 308). Similarly, relationship identifier 322 may identify couch representation 202 (via identifier 302, "couch"), and may be modified to identify a position of "to the right of." Specifically, the position indicates that vase representation 206 is now positioned "to the right of" couch representation 302, based on the device perspective (as opposed to previously being positioned "in front of" table representation 308). Relationship identifier 324 may similarly identify couch representation 202 (via identifier 302, "couch"), and may be modified to identify a position of "to the left of."

Various additional sets of definitions, or spatial ontologies, may be received from third parties in order to facilitate object identification for customized or otherwise additional objects. This proactive form of object identification may allow developers or other users to create various environmental settings based on gaming environments, social network environments, user training environments, and the like. These environments may be associated with additional spatial ontologies which may include, for example, the base definitions included in the first set of definitions (i.e., universal definitions), and additional definitions for user-generated objects (e.g., custom definitions for physical objects and/or virtual objects). The additional definitions may be shared across various applications, platforms, and the like. For instance, a second set of definitions, obtained from a third party, may be related to a game environment corresponding to a car racing game. In this environment, various game-specific virtual objects may be utilized, such as virtual cars and car components including as tires, steering wheels, lights, and the like. Base definitions in a first set of definitions may include an object having a descriptive identifier of "chair." Accordingly, the second set of definitions may also include an object having a descriptive identifier for "chair." The second set of definitions may also include an additional descriptive identifier for "racer chair." Here, the "racer chair" object may be associated with a parent identifier corresponding to "chair," such that the "chair" object corresponds to a parent object class of the "racer chair" object. In some examples, developers of the additional sets of definitions may add additional "child" identifiers to existing identifiers, but may not add new identifiers that are unassociated with a corresponding "parent" identifier. For example, developers may add additional "furniture" type identifiers (e.g., five-legged chair "is a" furniture), but may not add new object classes that do not exist in the first set of identifiers (e.g., "aircrafts").

In some examples, an application is provided access to the additional definition sets upon one or more conditions being satisfied. For example, in response to a user action placing a specific object within an extended reality setting (e.g., a racer chair), various applications related to the extended reality setting may be provided credentials or other access information in order to retrieve and utilize the additional definition sets including identifiers associated with the respective object.

In general, the definition sets (spatial ontologies) may be stored locally on the electronic device and/or updated periodically. For instance, the electronic device may obtain the first set of definitions from a secondary electronic device, such as a server. The device may then store the first set of definitions for use by the extended reality system. Once an update to the first set of definitions becomes available, an updated set of definitions is received which then replaces the stored set of definitions on the electronic device. In particular, additional objects or objects classes may be defined in the updated set of definitions. Various objects or objects classes may also be removed from the updated set of definitions. The updating of the set of definitions may also occur on a periodic basis (e.g., daily, weekly, monthly), and/or may occur while the electronic device is in a specific state (e.g., while charging) or at a specific time (e.g., overnight).

The user of the electronic device may interact with the extended reality environment based on various input modalities, such as via a controller and/or speech input. The set of identifiers may be utilized in order to interpret these user inputs. An intent associated with a user's speech input may thus be determined based at least in part on the set of identifiers. For example, a user input associated with the representation of the setting may received, such as a speech input including "move my vase to the shelf" An object reference may be identified from the speech input, such as "vase." One or more descriptive identifiers may be detected that match the identified object reference(s). For example, an application programming interface (API) may be utilized to query the set of identifiers in order to detect the respective descriptive identifiers. Here, descriptive identifiers for "vase," associated with identifier 306 ("vase") may be identified based a match to the object reference "vase." In particular, based on the set of identifiers, identifier 306 is located which corresponds to vase representation 206 in FIG. 2A. Accordingly, an output is provided based on the detected descriptive identifier, such as an output depicting the respective object representation moving in accordance with the user request. For example, as shown in FIGS. 2A-2B, vase representation 206 may be displayed as moving from table representation 208 to a location on a shelf representation.

Queries directed to parent type objects, in some examples, may result in a plurality of descriptive identifiers being detected. For example, a speech input such as "how many plants are in this room" may be received. A single descriptive identifier may be obtained corresponding to "plant" (based on a match to the uttered word "plants"). In this example, the respective identifier corresponding to "plants" may be associated with several "child" identifiers. More specifically, the set of identifiers may include identifiers for "peace lily," "jade" and "rubber fig." Each identifier may be associated with a parent identifier corresponding to "plants." For example, the identifier "peace lily" may be represented in connection with the parent identifier as "peace lily 'is a' plant." Thus, the query result may include returning all identifiers associated with the parent identifier "plants," specifically identifiers for "peace lily," "jade" and "rubber fig." Based on the returned identifiers, an output may be provided to the user, including "There are three different types of plants in this room," or "There are three plants in this room, a peace lily, a jade, and a rubber fig."

Figure 4:
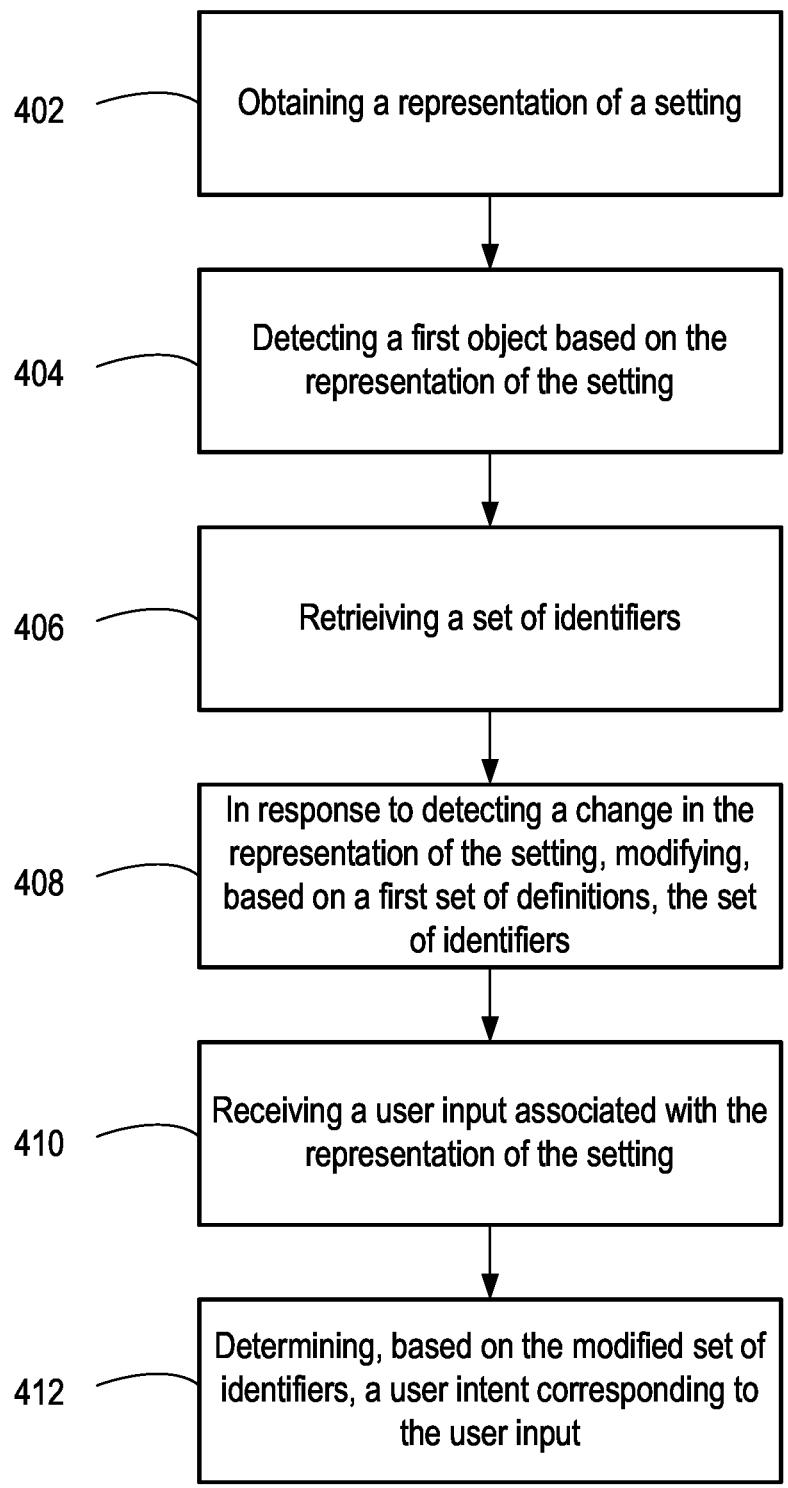
FIG. 4 depicts an exemplary process for object identification using one or more spatial ontologies.

Referring to FIG. 4, a flow chart of an exemplary process 400 for displaying a virtual display in an extended reality setting is depicted. Process 400 can be performed using a user device (e.g., device 100*a*). For example, the user device may be a handheld mobile device or a head-mounted device. In some embodiments, process 400 is performed using two or more electronic devices, such as a user device that is communicatively coupled to another device. The display of the user device may be transparent or opaque in various examples. Process 400 can be applied, for example, to extended reality applications, such as virtual reality, augmented reality, or mixed reality applications. Process 400 may also involve effects that include visible features as well as non-visible features, such as audio, haptic, or the like. One or more blocks of process 400 can be optional and/or additional blocks may be performed. Furthermore, the blocks of process 400 are depicted in a particular order, it should be appreciated that these blocks can be performed in other orders.

At block 402, a representation of a setting is obtained. At block 404, a first object is detected based on the representation of the setting. In some examples, the detected first object corresponds to one of a physical object or a virtual object. At block 406, a set of identifiers is retrieved. In some examples, the set of identifiers includes a descriptive identifier associated with the detected first object, wherein the descriptive identifier identifies a type of the detected first object. In some examples, the set of identifiers includes a parent identifier associated with the descriptive identifier, wherein the parent identifier corresponds to an object class. In some examples, the set of identifiers includes a relationship identifier associated with the detected first object, wherein the relationship identifier identifies a detected second object, and the relationship identifier identifies a position of the detected first object relative to the detected second object. In some examples, the identification of the position of the detected first object relative to the detected second object is dependent upon the perspective of the obtained representation of the setting. In some examples, the set of identifiers includes a relationship identifier associated with the detected first object, wherein the relationship identifier identifies the detected object as contained within a detected second object. In some examples, the set of identifiers includes a relationship identifier associated with the detected first object, wherein the relationship identifier identifies the detected first object as generated from a detected second object. In some examples, the set of identifiers includes a material identifier associated with the detected object, wherein the material identifier identifies a type of matter included within the detected first object. In some examples, the set of identifiers includes a coefficient associated with the detected object, wherein the coefficient corresponds to a property of the detected first object.

At block 408, in response to detecting a change in the representation of the setting, the set of identifiers is modified based on a first set of definitions. In some examples, movement of the detected first objected is detected from the representation of the setting, and the change in the representation of the setting is detected based on the movement of the detected first object. In some examples, modifying, based on a first set of definitions, the set of identifiers includes modifying a relationship identifier associated with the detected first object by modifying a positional value defining the position of the detected first object relative to a detected second object. In some examples, a change is detected in the representation of the setting by detecting, from the representation of the setting, a second object. In some examples, in accordance with a determination that the second object is not associated with any identifiers in the set of identifiers, the set of identifiers is modified by adding, to the set of identifiers: a descriptive identifier associated with the detected second object, a relationship identifier associated with the detected second object, and a material identifier associated with the detected second object. In some examples, in accordance with a determination that the second object is not associated with any identifiers in the set of identifiers, the set of identifiers is modified by obtaining the first set of definitions, and identifying the detected second object as corresponding to a respective descriptive identifier contained in the first set of definitions. In some examples, identifying the detected second object as corresponding to a descriptive identifier contained in the first set of definitions includes identifying the detected second object as corresponding to an object profile, wherein the a respective descriptive identifier corresponds to the object profile.

In some examples, a second set of definitions are obtained from a third party, and in response to detecting a change in the representation of the setting, the set of identifiers are modified based on the second set of definitions. In some examples, a second set of definitions are obtained from a third party, wherein the first set of definitions includes a first respective descriptive identifier, and the second set of definitions includes a parent identifier matching the respective descriptive identifier, and a second respective descriptive identifier associated with the parent identifier. In some examples, the first set of definitions are obtained from a secondary electronic device, and the first set of definitions are stored on the electronic device. In some examples, an updated set of definitions are obtained from the secondary electronic device, and the stored first set of definitions are replaced with the updated set of definitions.

At block 410, a user input associated with the representation of the setting is received. At block 412, a user intent corresponding to the user input is determined based on the modified set of identifiers. In some examples, determining, based on the modified set of identifiers, a user intent corresponding to the user input includes identifying, from the received user input, an object reference, detecting, from the modified set of identifiers, a descriptive identifier matching the object reference, and providing an output based on the detected descriptive identifier.

As described above, one aspect of the present technology is the gathering and use of data available from various sources to improve virtual object placement based on referential expressions. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enhance the accuracy of object identification using spatial ontologies. Accordingly, use of such personal information data enables users to calculated control of the object identification. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of object identification using spatial ontologies, the present technology can be configured to allow users to select to "opt in" or "opt out" of participation in the collection of personal information data during registration for services or anytime thereafter. In another example, users can select not to provide information regarding specific objects in a device environment. In yet another example, users can select to limit the length of time environment-specific data is maintained or entirely prohibit certain environment-specific data from being gathered. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, if the user is viewing an entirely virtual environment, personal information such as user preferences to frequently visit "virtual kitchens" may be restricted from use (e.g., arrangement of virtual kitchen appliances and other objects may otherwise reveal information about the user). As another example, content can be selected and delivered to users by inferring preferences based on non-personal information data or a bare minimum amount of personal information, such as the content being requested by the device associated with a user, other non-personal information available to the system for object identification using spatial ontologies, or publicly available information.

What is claimed is:

1. An electronic device, comprising:
one or more processors; and
memory storing one or more programs configured to be executed by the one or more processors, the one or more programs including instructions for:
obtaining a representation of a setting, wherein the representation of the setting includes at least one representation of a physical object and at least one representation of a virtual object;
detecting a first object based on the representation of the setting;
retrieving a set of identifiers;
detecting a change in the representation of the setting by detecting, from the representation of the setting, a second object;

in response to detecting a change in the representation of the setting:
    modifying, based on a first set of definitions, the set of identifiers, wherein the first set of definitions includes a plurality of physical object definitions and a plurality of virtual object definitions;
in accordance with a determination that the second object is not associated with any identifiers in the set of identifiers:
    modifying the set of identifiers by adding, to the set of identifiers:
        a descriptive identifier associated with the detected second object;
        a relationship identifier associated with the detected second object; and
        a material identifier associated with the detected second object;
    receiving a user input associated with the representation of the setting; and
    determining, based on the modified set of identifiers, a user intent corresponding to the user input.

2. The electronic device of claim 1, wherein the set of identifiers includes a descriptive identifier associated with the detected first object, wherein the descriptive identifier identifies a type of the detected first object.

3. The electronic device of claim 1, wherein the set of identifiers includes a relationship identifier associated with the detected first object, wherein
    the relationship identifier identifies a detected second object, and
    the relationship identifier identifies a position of the detected first object relative to the detected second object.

4. The electronic device of claim 1, wherein the set of identifiers includes a relationship identifier associated with the detected first object, wherein
    the relationship identifier identifies the detected object as contained within a detected second object.

5. The electronic device of claim 1, wherein the set of identifiers includes a relationship identifier associated with the detected first object, wherein
    the relationship identifier identifies the detected first object as generated from a detected second object.

6. The electronic device of claim 1, wherein the set of identifiers includes a material identifier associated with the detected object, wherein
    the material identifier identifies a type of matter included within the detected first object.

7. The electronic device of claim 1, the one or more programs including instructions for:
    detecting, from the representation of the setting, movement of the detected first object; and
    detecting the change in the representation of the setting based on the movement of the detected first object, wherein modifying, based on a first set of definitions, the set of identifiers comprises:
        modifying a relationship identifier associated with the detected first object by modifying a positional value defining the position of the detected first object relative to a detected second object.

8. The electronic device of claim 1, the one or more programs including instructions for:
    detecting a change in the representation of the setting by detecting, from the representation of the setting, a second object; and
    in accordance with a determination that the second object is not associated with any identifiers in the set of identifiers, modifying the set of identifiers by:
        obtaining the first set of definitions; and
        identifying the detected second object as corresponding to a respective descriptive identifier contained in the first set of definitions.

9. The electronic device of claim 1, the one or more programs including instructions for:
    obtaining, from a third party, a second set of definitions; and
    in response to detecting a change in the representation of the setting:
        modifying, based on the second set of definitions, the set of identifiers.

10. The electronic device of claim 1, the one or more programs including instructions for:
    obtaining, from a third party, a second set of definitions, wherein
        the first set of definitions includes a first respective descriptive identifier; and
        the second set of definitions includes
            a parent identifier matching the respective descriptive identifier, and
            a second respective descriptive identifier associated with the parent identifier.

11. The electronic device of claim 1, the one or more programs including instructions for:
    obtaining, from a secondary electronic device, the first set of definitions;
    storing the first set of definitions on the electronic device;
    obtaining, from the secondary electronic device, an updated set of definitions; and
    replacing the stored first set of definitions with the updated set of definitions.

12. The electronic device of claim 1, wherein determining, based on the modified set of identifiers, a user intent corresponding to the user input comprises:
    identifying, from the received user input, an object reference;
    detecting, from the modified set of identifiers, a descriptive identifier matching the object reference; and
    providing an output based on the detected descriptive identifier.

13. A non-transitory computer-readable storage medium storing one or more programs configured to be executed by one or more processors of an electronic device, the one or more programs including instructions for:
    obtaining a representation of a setting, wherein the representation of the setting includes at least one representation of a physical object and at least one representation of a virtual object;
    detecting a first object based on the representation of the setting;
    retrieving a set of identifiers;
    detecting a change in the representation of the setting by detecting, from the representation of the setting, a second object;
    in response to detecting a change in the representation of the setting:
        modifying, based on a first set of definitions, the set of identifiers, wherein the first set of definitions includes a plurality of physical object definitions and a plurality of virtual object definitions;
    in accordance with a determination that the second object is not associated with any identifiers in the set of identifiers:

modifying the set of identifiers by adding, to the set of identifiers:
  a descriptive identifier associated with the detected second object;
  a relationship identifier associated with the detected second object; and
  a material identifier associated with the detected second object;
receiving a user input associated with the representation of the setting; and
determining, based on the modified set of identifiers, a user intent corresponding to the user input.

14. The non-transitory computer-readable storage medium of claim 13, wherein the set of identifiers includes a descriptive identifier associated with the detected first object, wherein the descriptive identifier identifies a type of the detected first object.

15. The non-transitory computer-readable storage medium of claim 13, wherein the set of identifiers includes a relationship identifier associated with the detected first object, wherein
  the relationship identifier identifies a detected second object, and
  the relationship identifier identifies a position of the detected first object relative to the detected second object.

16. The non-transitory computer-readable storage medium of claim 13, wherein the set of identifiers includes a relationship identifier associated with the detected first object, wherein
  the relationship identifier identifies the detected object as contained within a detected second object.

17. The non-transitory computer-readable storage medium of claim 13, wherein the set of identifiers includes a relationship identifier associated with the detected first object, wherein
  the relationship identifier identifies the detected first object as generated from a detected second object.

18. The non-transitory computer-readable storage medium of claim 13, wherein the set of identifiers includes a material identifier associated with the detected object, wherein
  the material identifier identifies a type of matter included within the detected first object.

19. The non-transitory computer-readable storage medium of claim 13, the one or more programs including instructions for:
  detecting, from the representation of the setting, movement of the detected first object; and
  detecting the change in the representation of the setting based on the movement of the detected first object, wherein modifying, based on a first set of definitions, the set of identifiers comprises:
    modifying a relationship identifier associated with the detected first object by modifying a positional value defining the position of the detected first object relative to a detected second object.

20. The non-transitory computer-readable storage medium of claim 13, the one or more programs including instructions for:
  detecting a change in the representation of the setting by detecting, from the representation of the setting, a second object; and
  in accordance with a determination that the second object is not associated with any identifiers in the set of identifiers, modifying the set of identifiers by:
    obtaining the first set of definitions; and
    identifying the detected second object as corresponding to a respective descriptive identifier contained in the first set of definitions.

21. The non-transitory computer-readable storage medium of claim 13, the one or more programs including instructions for:
  obtaining, from a third party, a second set of definitions; and
  in response to detecting a change in the representation of the setting:
    modifying, based on the second set of definitions, the set of identifiers.

22. The non-transitory computer-readable storage medium of claim 13, the one or more programs including instructions for:
  obtaining, from a third party, a second set of definitions, wherein
    the first set of definitions includes a first respective descriptive identifier; and
    the second set of definitions includes
      a parent identifier matching the respective descriptive identifier, and
      a second respective descriptive identifier associated with the parent identifier.

23. The non-transitory computer-readable storage medium of claim 13, the one or more programs including instructions for:
  obtaining, from a secondary electronic device, the first set of definitions;
  storing the first set of definitions on the electronic device;
  obtaining, from the secondary electronic device, an updated set of definitions; and
  replacing the stored first set of definitions with the updated set of definitions.

24. The non-transitory computer-readable storage medium of claim 13, wherein determining, based on the modified set of identifiers, a user intent corresponding to the user input comprises:
  identifying, from the received user input, an object reference;
  detecting, from the modified set of identifiers, a descriptive identifier matching the object reference; and
  providing an output based on the detected descriptive identifier.

25. A method, comprising:
  obtaining a representation of a setting, wherein the representation of the setting includes at least one representation of a physical object and at least one representation of a virtual object;
  detecting a first object based on the representation of the setting;
  retrieving a set of identifiers;
  detecting a change in the representation of the setting by detecting, from the representation of the setting, a second object;
  in response to detecting a change in the representation of the setting:
    modifying, based on a first set of definitions, the set of identifiers, wherein the first set of definitions includes a plurality of physical object definitions and a plurality of virtual object definitions;
  in accordance with a determination that the second object is not associated with any identifiers in the set of identifiers:

modifying the set of identifiers by adding, to the set of identifiers:
  a descriptive identifier associated with the detected second object;
  a relationship identifier associated with the detected second object; and
  a material identifier associated with the detected second object;
receiving a user input associated with the representation of the setting; and
determining, based on the modified set of identifiers, a user intent corresponding to the user input.

26. The method of claim 25, wherein the set of identifiers includes a descriptive identifier associated with the detected first object, wherein the descriptive identifier identifies a type of the detected first object.

27. The method of claim 25, wherein the set of identifiers includes a relationship identifier associated with the detected first object, wherein
  the relationship identifier identifies a detected second object, and
  the relationship identifier identifies a position of the detected first object relative to the detected second object.

28. The method of claim 25, wherein the set of identifiers includes a relationship identifier associated with the detected first object, wherein
  the relationship identifier identifies the detected object as contained within a detected second object.

29. The method of claim 25, wherein the set of identifiers includes a relationship identifier associated with the detected first object, wherein
  the relationship identifier identifies the detected first object as generated from a detected second object.

30. The method of claim 25, wherein the set of identifiers includes a material identifier associated with the detected object, wherein the material identifier identifies a type of matter included within the detected first object.

31. The method of claim 25, comprising:
detecting, from the representation of the setting, movement of the detected first object; and
detecting the change in the representation of the setting based on the movement of the detected first object, wherein modifying, based on a first set of definitions, the set of identifiers comprises:
  modifying a relationship identifier associated with the detected first object by modifying a positional value defining the position of the detected first object relative to a detected second object.

32. The method of claim 25, comprising:
detecting a change in the representation of the setting by detecting, from the representation of the setting, a second object; and
in accordance with a determination that the second object is not associated with any identifiers in the set of identifiers, modifying the set of identifiers by:
  obtaining the first set of definitions; and
  identifying the detected second object as corresponding to a respective descriptive identifier contained in the first set of definitions.

33. The method of claim 25, comprising:
obtaining, from a third party, a second set of definitions; and
in response to detecting a change in the representation of the setting:
  modifying, based on the second set of definitions, the set of identifiers.

34. The method of claim 25, comprising:
obtaining, from a third party, a second set of definitions, wherein
  the first set of definitions includes a first respective descriptive identifier; and
  the second set of definitions includes
    a parent identifier matching the respective descriptive identifier, and
    a second respective descriptive identifier associated with the parent identifier.

35. The method of claim 25, comprising:
obtaining, from a secondary electronic device, the first set of definitions;
storing the first set of definitions on the electronic device;
obtaining, from the secondary electronic device, an updated set of definitions; and
replacing the stored first set of definitions with the updated set of definitions.

36. The method of claim 25, wherein determining, based on the modified set of identifiers, a user intent corresponding to the user input comprises:
identifying, from the received user input, an object reference;
detecting, from the modified set of identifiers, a descriptive identifier matching the object reference; and
providing an output based on the detected descriptive identifier.

* * * * *